(12) United States Patent
Lu et al.

(10) Patent No.: US 10,446,311 B2
(45) Date of Patent: Oct. 15, 2019

(54) WIRELESS CHARGING RECEIVING DEVICE

(71) Applicant: PEGATRON CORPORATION, Taipei (TW)

(72) Inventors: Chin-Yu Lu, Taipei (TW); Yen-Ming Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 46 days.

(21) Appl. No.: 15/724,116

(22) Filed: Oct. 3, 2017

(65) Prior Publication Data

US 2018/0096772 A1  Apr. 5, 2018

(30) Foreign Application Priority Data

Oct. 4, 2016 (TW) .................................. 105132108

(51) Int. Cl.
| | | |
|---|---|---|
| *H01F 27/02* | (2006.01) | |
| *H02J 7/02* | (2016.01) | |
| *H01F 27/32* | (2006.01) | |
| *H01F 27/28* | (2006.01) | |
| *H01F 38/14* | (2006.01) | |
| *H02J 50/10* | (2016.01) | |

(52) U.S. Cl.
CPC ........... *H01F 27/02* (2013.01); *H01F 27/288* (2013.01); *H01F 27/32* (2013.01); *H01F 38/14* (2013.01); *H02J 7/025* (2013.01); *H02J 50/10* (2016.02)

(58) Field of Classification Search
CPC .......... H01F 27/02; H01F 38/14; H01F 27/32; H01F 27/288; H02J 50/10; H02J 7/025

USPC ......................................................... 320/108
See application file for complete search history.

(56) References Cited

U.S. PATENT DOCUMENTS

| | | | | |
|---|---|---|---|---|
| 7,443,343 | B2 * | 10/2008 | Schlegel .............. | H01Q 1/3291 343/700 MS |
| 9,461,500 | B2 * | 10/2016 | Tseng ...................... | H02J 7/025 |
| 9,973,023 | B2 * | 5/2018 | Kari ......................... | H01F 38/14 |
| 10,172,266 | B2 * | 1/2019 | Yang ................... | H05K 13/0069 |
| 2009/0267559 | A1 * | 10/2009 | Toya ...................... | H02J 7/025 320/108 |

(Continued)

FOREIGN PATENT DOCUMENTS

| | | |
|---|---|---|
| CN | 103891098 | 6/2014 |
| TW | 201521318 | 6/2015 |

*Primary Examiner* — M Baye Diao
(74) *Attorney, Agent, or Firm* — J.C. Patents

(57) ABSTRACT

A wireless charging receiving device for receiving power from a power transmitting device of wireless charging including a body having an accommodation space and a slot, an induction coil and an electromagnetic absorption member in the accommodation space, and a power storage module is provided. At least a portion of the body has a metal shell corresponded to the accommodation space. The slot disposed in the metal shell connects the accommodation space and an exterior edge of the metal shell. The induction coil is insulatedly abutted against the metal shell and electrically connected with the power storage module. The power transmitting device magnetically resonates with the metal shell through generating an electromagnetic field. The metal shell generates an induced current and an electromagnetic field along the slot, and power converted from the energy of the electromagnetic field is transferred and stored in the power storage module.

9 Claims, 3 Drawing Sheets

(56) References Cited

U.S. PATENT DOCUMENTS

| | | | |
|---|---|---|---|
| 2012/0262002 A1* | 10/2012 | Widmer | B60L 53/65 307/104 |
| 2015/0077047 A1 | 3/2015 | Chen | |
| 2015/0115880 A1* | 4/2015 | Soar | F41G 11/00 320/108 |
| 2015/0197155 A1* | 7/2015 | Lu | B60L 11/182 320/108 |
| 2015/0303735 A1* | 10/2015 | Kari | H01F 38/14 320/108 |
| 2016/0072303 A1 | 3/2016 | Jeong | |

* cited by examiner

WIRELESS CHARGING RECEIVING DEVICE

CROSS-REFERENCE TO RELATED APPLICATION

This application claims the priority benefit of Taiwan application serial no. 105132108, filed on Oct. 4, 2016. The entirety of the above-mentioned patent application is hereby incorporated by reference herein and made a part of this specification.

BACKGROUND

1. Technical Field

The disclosure generally relates to a wireless charging receiving device.

2. Description of Related Art

Wireless charging technology uses the electromagnetic principle to achieve a power charging effect, so as to enable electronic products to complete power charging in the absence of wiring, thereby increasing the convenience of the electronic products. Thus, the wireless charging technology also becomes one of the major developments of the industry.

However, conventional electronic products with wireless charging function are mostly limited to shells made with non-metallic material, and this is because shells made with metallic material have negative effects on the performance of wireless charging. For example, during the state of wireless charging, a metal shell can shield electromagnetic waves, and thus weakens the power charging efficiency and is liable to produce heat and other issues.

SUMMARY

The disclosure is directed to a wireless charging receiving device capable of performing wireless charging through a body having a metal shell.

The wireless charging receiving device of the disclosure is adapted to receive power from a power transmitting device of wireless charging. The wireless charging receiving device includes a body, an induction coil, a power storage module, and an electromagnetic absorption member. The body has an accommodation space and a slot, at least a portion of the body includes a metal shell, and the position of the accommodation space is corresponded to the metal shell. The slot is located in the metal shell, and the slot connects the accommodation space and an exterior edge of the metal shell. The induction coil and the electromagnetic absorption member are disposed in the accommodation space, wherein the induction coil is insulatedly abutted against the metal shell. The power storage module is disposed in the body and electrically connected to the induction coil. The electromagnetic absorption member shields the induction coil. The power transmitting device is adapted to magnetically resonate with the metal shell through generating an electromagnetic field, wherein the metal shell generates an induced current and a corresponding electromagnetic field along the slot, and the induction coil is configured to convert energy of the corresponding electromagnetic field into the power to be transferred and stored in the power storage module. The electromagnetic absorption member is configured to block an interference from the metal shell to the electromagnetic field so as to enhance a power conversion efficiency.

In one embodiment of the invention, the metal shell has a first surface and a second surface opposite to each other. The power transmitting device is adapted to face the first surface, and the induction coil is located between the electromagnetic absorption member and the first surface.

In one embodiment of the invention, the wireless charging receiving device further includes an insulation member disposed in the accommodation space and located within the induction coil. A side of the insulation member is abutted against the electromagnetic absorption member, and another side of the insulation member extends from the accommodation space to the first surface.

In one embodiment of the invention, the slot connects the first surface and the second surface by penetrating through the metal shell.

In one embodiment of the invention, the body includes a first member and a second member, and the second member is hinge jointed with the first member so that the second member is able to open up and close off relative to the first member. The second member is the metal shell. When the second member opens up relative to the first member, the power transmitting device is adapted to face towards a surface of the second member.

In one embodiment of the invention, the electromagnetic absorption member is a ferrite sheet material.

In one embodiment of the invention, the wireless charging receiving device further includes a copper foil and a conductive pressure sensitive adhesive, the induction coil is insulatedly abutted against the copper foil, and the conductive pressure sensitive adhesive is coated between the copper foil and the metal shell.

In one embodiment of the invention, the second member has a first edge and a second edge opposite to each other, and the first edge is hinge jointed with the first member. The slot is located at the first edge and breaks open the first edge.

In one embodiment of the invention, an electrical insulation structure is further included at where the first member and the second member are hinge jointed.

In one embodiment of the invention, the second member has a first edge and a second edge different from each other, the first edge is hinge jointed with the first member, and the slot is located at the second edge and breaks open the second edge.

In view of the above, in the wireless charging receiving device, the body having the metal shell accommodates the magnetic field absorbing material and the induction coil within the accommodation space of the metal shell, and the metal shell has the slot that connects the accommodation space and the exterior edge of the metal shell, wherein the power storage module is electrically connected to the induction coil. As such, the power transmitting device resonates with the metal shell when providing the electromagnetic field to the metal shell, so that the metal shell generates an eddy current and the corresponding electromagnetic field along the slot and the induction coil to enable the induction coil to convert the energy of the corresponding electromagnetic field into the power to be transferred and stored in the power storage module. The electromagnetic absorption member is configured to shield the induction coil so as to block the interference from the metal shell to the electromagnetic field and to enhance the power conversion efficiency, so that the metal shell is able to effectively use the eddy current generated thereby and become conducive in increasing the flow and the performance of the induced current.

In order to make the aforementioned and other features and advantages of the disclosure comprehensible, several exemplary embodiments accompanied by figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
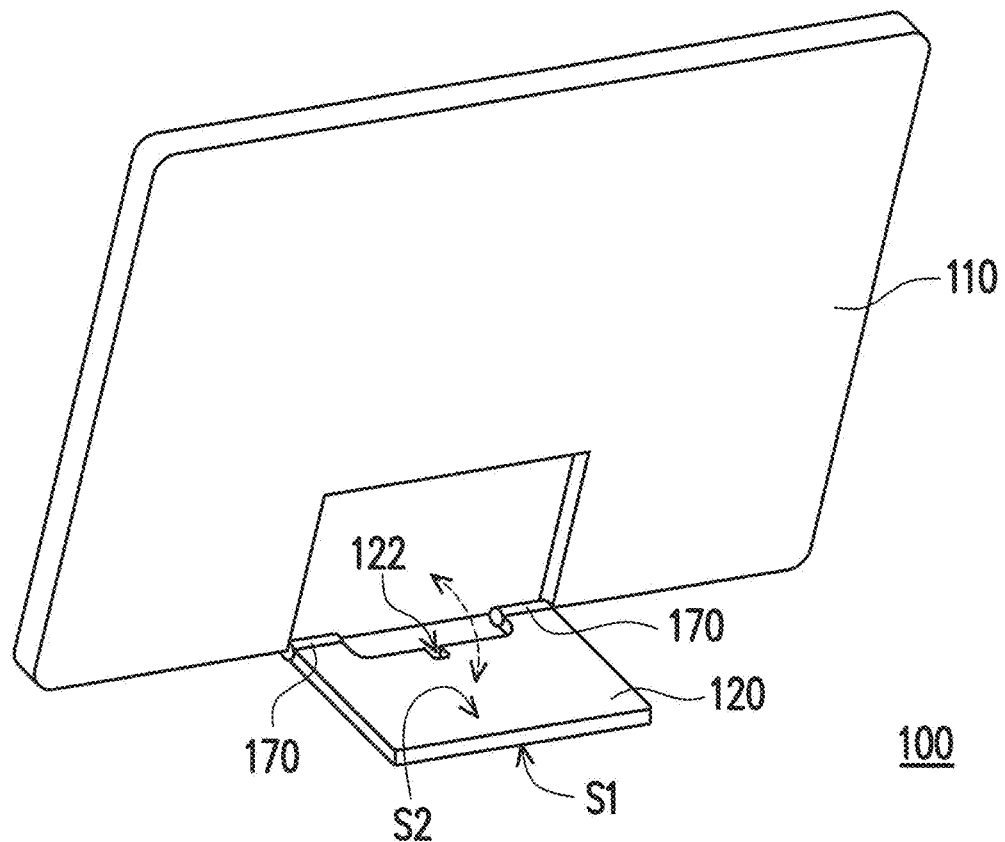
FIG. 1 is a schematic diagram illustrating a wireless charging receiving device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
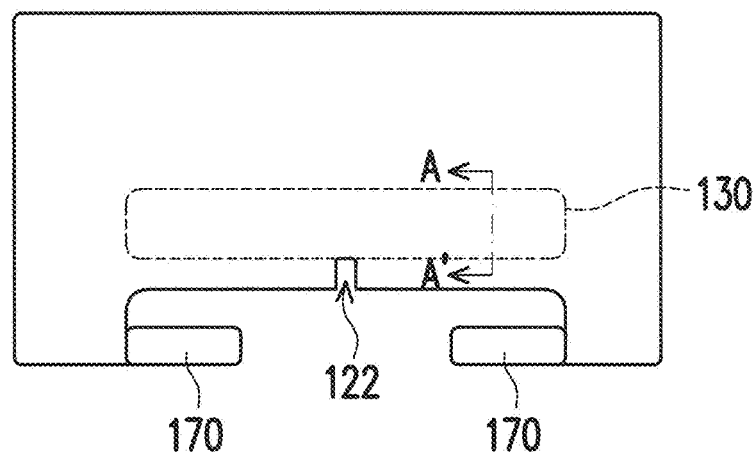
FIG. 2 is a schematic diagram illustrating partial components of FIG. 1 from another perspective.

FIG. 1 is a schematic diagram illustrating a wireless charging receiving device according to an embodiment of the invention. FIG. 2 is a schematic diagram illustrating partial components of FIG. 1 from another perspective. Referring to FIG. 1 and FIG. 2 at the same time, in the present embodiment, the wireless charging receiving device 100 is, for example, a Tablet PC, of which a body includes a first member 110 and a second member 120, wherein the first member 110 is, for example, a host, and the second member 120 is, for example, a foot stand. The second member 120 is connected to the first member 110 via a hinge joint mechanism 170, so that the second member 120 can open up and close down by rotating relative to the first member 110.

Figure 3:
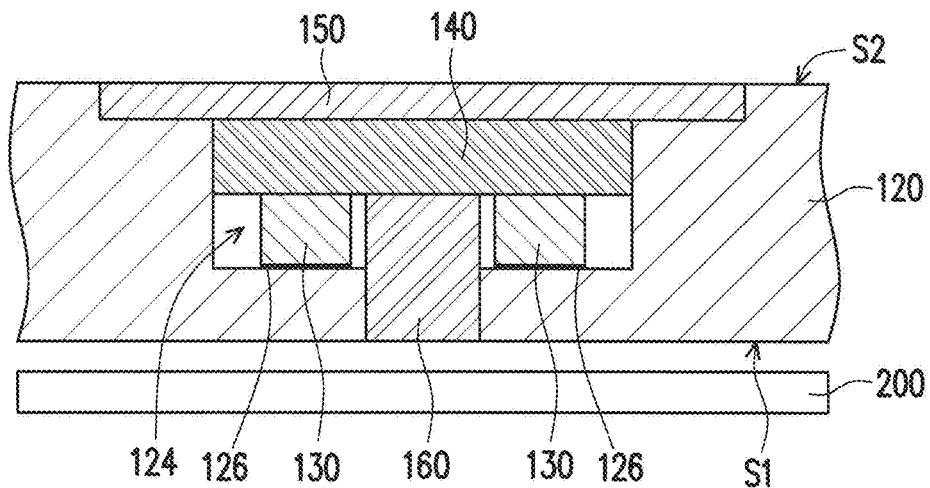
FIG. 3 illustrates a cross-sectional diagram along a section line A-A' shown in FIG. 2.

FIG. 3 illustrates a cross-sectional diagram along a section line A-A' shown in FIG. 2, which is in a state of power charging. Referring to FIG. 1 through FIG. 3 at the same time, in the present embodiment, the second member 120 of the body is a metal shell and has an accommodation space 124 and a slot 122. A position of the accommodation space 124 is corresponded to that of the metal shell. The wireless charging receiving device 100 further includes an induction coil 130, an electromagnetic absorption member 140 and a spacer 150 disposed in the accommodation space 124, wherein the induction coil 130 is insulated from and abutted against the second member 120. Take for an instance, the insulation layer 126 is disposed at where the induction coil 130 is abutted against the second member 120. The spacer 150 is, for example, a PET polyester film (MYLAR), which is disposed at a second surface S2 of the second member 120 so as to fill up the accommodation space 122. The electromagnetic absorption member 140 is, for example, a ferrite sheet material, which is located between the spacer 150 and the induction coil 130 and covers the induction coil 130.

Figure 4:
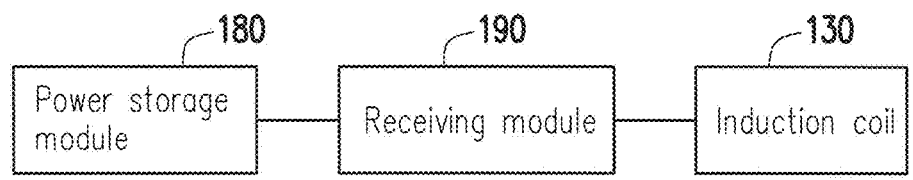
FIG. 4 illustrates an electrical connection relationship diagram between some components in the wireless charging receiving device of FIG. 1.

FIG. 4 illustrates an electrical connection relationship diagram between some components in the wireless charging receiving device of FIG. 1. Referring to FIG. 2 through FIG. 4 at the same time, a power transmitting device 200 is substantially disposed near the first surface S1 of the second member 120 and faces towards the first surface S1, and the induction coil 130 is located between the electromagnetic absorption member 140 and the first surface S1. The wireless charging receiving device 100 further includes a power storage module 180 and a receiving module 190 disposed in the body, and the induction coil 130 is electrically connected to the power storage module 180 through the receiving module 190. Moreover, the wireless charging receiving device 100 further includes an insulation member 160, which is disposed at the accommodation space 124 and located inside the induction coil 130. That is, the insulation member 160 is substantially surrounded by the induction coil 130. Herein, a side of the insulation member 160 is abutted against the electromagnetic absorption member 140, while another side of the insulation member 160 extends from the accommodation space 124 to the first surface S1, so as to support the induction coil 130 and prevent it from being deformed.

Based on the above component configuration, the power transmitting device 200 is adapted to magnetically resonate with the metal shell (which is the second member 120) through generating an electromagnetic field, so as to enable the metal shell generate an induced current and a corresponding electromagnetic field along the slot 122, so that the induction coil 130 can convert the energy of the corresponding electromagnetic field into power that is to be transferred and stored in the power storage module 180, wherein the electromagnetic absorption member 140 is configured to block an interference from the metal shell to the electromagnetic field so as to enhance a power conversion efficiency. In details, a portion of the corresponding electromagnetic field causes the induction coil 130 to generate an induced current, while another portion of the corresponding electromagnetic field causes the metal shell to generate an induced current (which is an eddy current) along the slot 122 and the induction coil 130, wherein a direction of an induced magnetic field generated by the eddy current is the same as a direction of an induced magnetic field of the induction coil 130, and thus can enhance the induced current on the induction coil 130, thereby effecting converting the energy of the corresponding electromagnetic field into power that is to be transferred by the receiving module 190 and stored in the power storage module 180. In other words, since the slot 122 connects the first surface S1 and the second surface S2 by penetrating through the second member 120 (as shown in FIG. 1 and FIG. 2, the first surface S1 and the second surface S2 face towards each other), and the slot 122 extends from the accommodation space 124 (at where the induction coil 130 locates) to an exterior edge of the second member 120 (i.e., the metal shell), the eddy current generated by the metal shell due to the electromagnetic field substantially has an additive effect on the induced current of the induction coil 130, and thus is also able to ameliorate the problem of poor heat dissipation in conventional non-metallic materials used for wireless charging.

Thus, corresponds to the state of FIG. 1, it can be known that when the second member 120 opens up relative to the first member 110 so as to be supported on a platform (not shown), the power transmitting device 200 can be disposed on the platform to perform wireless charging when the second member 120 is lean against the platform. At the same time, in the present embodiment, since the second member 120 serves as the foot stand for supporting the first member 110, during the usage, the second member 120 is usually opened up relative to the first member 110 and tiles flat on the platform (not shown) in correspondence to the power transmitting device 200 on the platform, in the state as shown in FIG. 1. Thus, by disposing the aforementioned wireless charging related components in the second member 120, a power charging operation can thus be performed to the wireless charging receiving device 100 at any time. In another state, in which the second member 120 is accommodated in a groove of the first member 110, the wireless charging receiving device 100 is in an operating state of lying flat on the platform, and the power charging effect can also be attained through the collaboration between the second member 120 and the power transmitting device 200 on the platform. It can be known from the above that, by disposing the power charging related structures in the foot stand structure (i.e., the second member 120), which is capable of being opened up and closed down, the wireless charging receiving device 100 can be charged any time without being effected by the operating states.

In the present embodiment, the receiving module 190, for example, includes a matching circuit, a rectifying element, a voltage converting element, a power management element and etc., so as to facilitate the transmission of the induced current of the induction coil to the power storage module 180, but the configuration of the receiving module 190 is not limited thereto.

Moreover, in another embodiment of the invention (not shown), the second member may also be a part of the first member (such that the first member and the second member are an integrally formed rigid body structure), namely, the body has the structure of the metal shell, such as a back shell of a mobile phone, the process of wireless charging may also be successfully completed in the same manner as the structures shown in FIG. 2 through FIG. 4.

Figure 5:
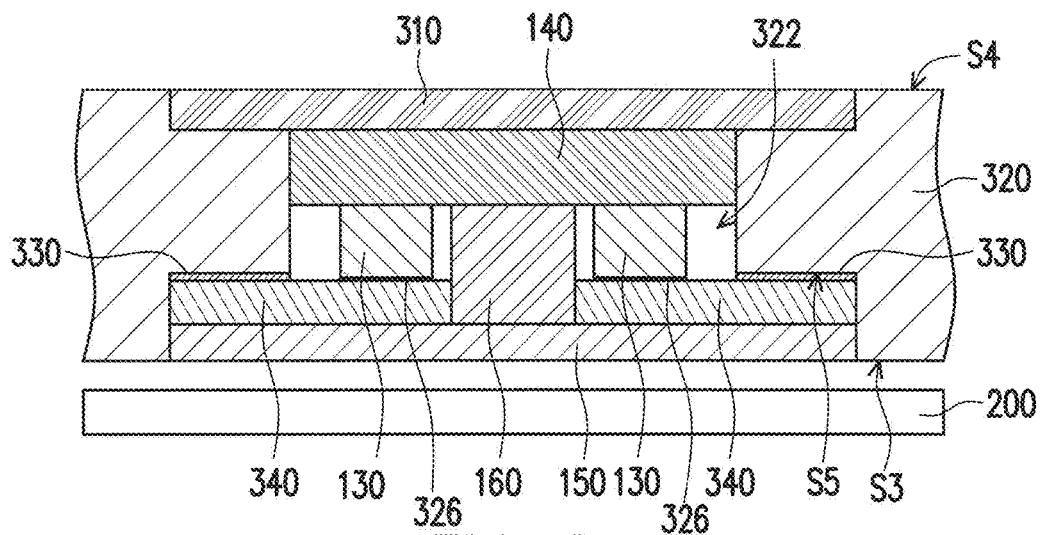
FIG. 5 is a partial cross-sectional diagram illustrating a wireless charging receiving device according to another embodiment of the invention.

FIG. 5 is a partial cross-sectional diagram illustrating a wireless charging receiving device according to another embodiment of the invention. Referring to FIG. 5 in comparison with FIG. 3, different from the configuration of the previous embodiment in which the induction coil 130 is physically in contact with the metal shell (i.e., the second member 120), the metal shell 320 further has an inner surface S5 located at the accommodation space 322 which appear to form a ladder-like shape with the first surface S3 of the metal shell 320, and the wireless charging receiving device further includes a copper foil 340 and a conductive pressure sensitive adhesive 330, wherein the copper foil 340 is abuttedly connected between the spacer 150 and the induction coil 130, an insulation layer 326 is included between the induction coil 130 and the copper foil 340, and the conductive pressure sensitive adhesive 330 is disposed on the inner surface S5 so as to enable the copper foil 340 to be electrically conducted with the metal shell 320 through the conductive pressure sensitive adhesive 330, thereby achieving the same effect as provided by the previous embodiment.

In the present embodiment, the copper foil 340 has a thinner thickness (a thickness of 0.1 mm), and thus can greatly reduce a required thickness of the metal shell 320, thereby enabling the metal shell 320 to have a thin appearance effect. During the assembly process, the magnetic field absorbing material 140 may be attached onto a thinner exterior metal cover 310 before the induction coil 130 is attached to the magnetic field absorbing material 140. On the other hand, the copper foil 340 and the insulation member 160 are disposed on the spacer 150. Finally, after coating the conductive pressure sensitive adhesive 330 on the inner surface S5 of the metal shell 330, the aforementioned semi-finished product can thus be docked into the accommodation space 322 of the metal shell 320 through the first surface S3 and the second surface S4, respectively, so as to complete the assembly process of the wireless charging receiving device while maintaining a structural strength thereof. Yet, there is no restriction on the order of the assembly steps. Moreover, the exterior metal cover 310 may also enable the overall structure as shown in FIG. 5 to have a favorable structure strength under the condition of having a thinner thickness. In addition, the copper foil 340 may also be replaced by other metal materials with better conductivity.

Figure 6:
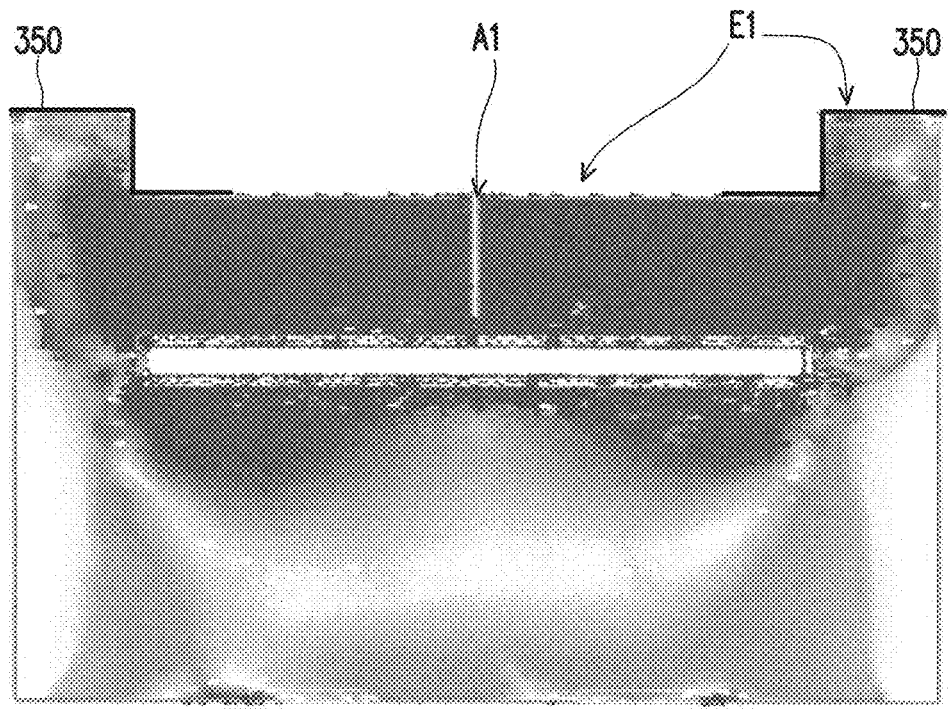
FIG. 6 is a schematic diagram illustrating a metal shell with induced current thereon according to an embodiment of the invention.

FIG. 6 is a schematic diagram illustrating a metal shell with induced current thereon according to an embodiment of the invention, so as to correspond to the power charging state of the second member 120 as shown in FIG. 2. Referring to FIG. 2 and FIG. 6 at the same time, in the present embodiment, degrees of grayscale (dark to light) are being used to represent intensities (strong to weak) of the induced current on the metal shell. Accordingly, it can be known that, due to an influence of marginal effect, induced currents are aggregated around a slot A1 (corresponds to the aforementioned slot 122), and thus by disposing the induction coil 130 in a dark region shown in FIG. 6, it is able to successfully obtain the induced currents through magnetic resonance, thereby achieving the effect of power charging. Herein, the second member 120 has a first edge E1 and a second edge E2 opposite to each other, wherein the first edge E1 is configured to hinge joint with the first member 110, and the slot A1 is located at the first edge E1 and breaks open the first edge E1. Further, in order to prevent a loss of induced current, in the present embodiment, an electrical insulation structure 350 is further included at where the first member 110 and the second member 120 are hinge jointed, thereby preventing the induced current (i.e., the eddy current) on the second member 120 from being traction spread to the first member 110 due to contacting the first member 110. Herein, the electrical insulation structure 350 is, for example, an insulation coating on a structure surface; whereas, in other embodiments, it may also be made with an insulation material at where the first member and the second member are hinge jointed so as to achieve the same effect.

Figure 7:
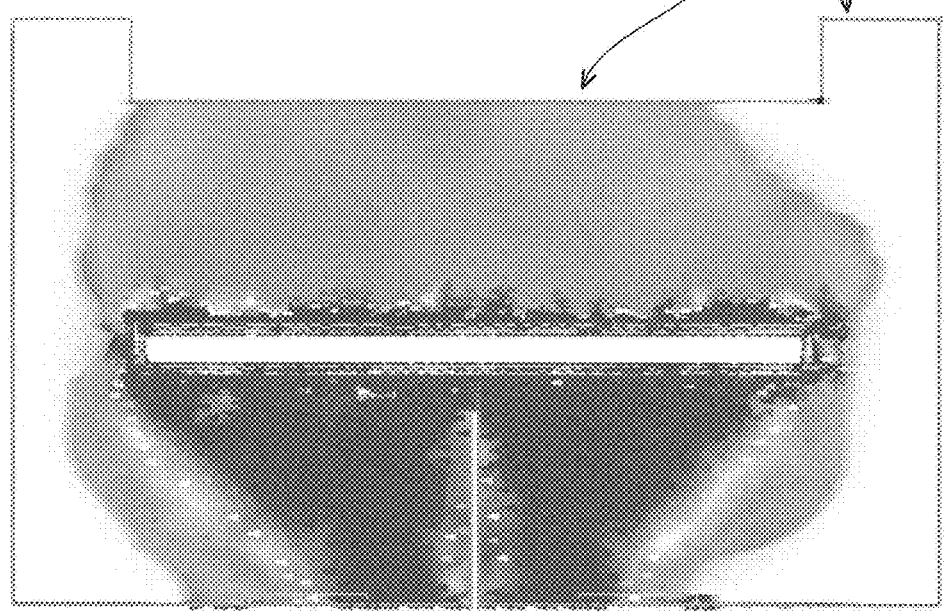
FIG. 7 is a schematic diagram illustrating a metal shell with induced current thereon according to another embodiment of the invention.

FIG. 7 is a schematic diagram illustrating a metal shell with induced current thereon according to another embodiment of the invention. Referring to FIG. 7 in comparison with FIG. 2, the structure as shown in FIG. 7 may also correspond to the second member 120 of FIG. 2. The metal shell of the present embodiment also has a first edge E1a and a second edge E2a, wherein the first edge E1a is also used to hinge joint with the first member 110, except that a slot A2 is disposed at the second edge E2a and breaks open the second edge E2a. As a result, an eddy current formed during power charging falls on the second edge E2a so that the induction coil 130 is also changed to be disposed nearby the slot A2 of the second edge E2a, and concurrently, no electrical insulation structure is required to be included between first edge E1a of the present embodiment and the first member 110.

In summary, the embodiments of the wireless charging receiving device of the invention, the magnetic field absorbing material and the induction coil are disposed in the accommodation space of the metal shell, and the metal shell has the slot for connecting the accommodation space and the exterior edge of the metal shell, wherein the power storage module is electrically connected to the induction coil, and the induction coil is electrically connected the metal shell. As such, when the power transmitting device provides the electromagnetic field to the induction coil and the metal shell, the electromagnetic field magnetically resonates with the metal shell to enable the metal shell to generate an eddy current through electromagnetic induction along the slot and the induction coil, and thus enhances the induced current on the induction coil, thereby enabling the energy of the electromagnetic field to be effectively converted into the power to be transferred and stored in the power storage module. This allows the metal shell to effectively use the eddy current generated thereby and become conducive in increasing the flow and the performance of the induced current.

On the other hand, in order for the metal shell to have a thinner appearance in response to a metal shell with thinner thickness, the disposition of the induction coil can be changed and be electrically connected to the metal shell through the copper foil and the conductive pressure sensitive adhesive, such that the components can be combined into the accommodation space of the metal shell in an opposite manner, thereby also attaining a body structure which is capable of performing a wireless charging function. At the same time, the aggregation effect of the eddy current may also be improved by selecting material with better conductivity for the metal shell.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wireless charging receiving device, adapted to receive power from a power transmitting device of wireless charging, the wireless charging receiving device comprising:
    a body, having an accommodation space and a slot, wherein at least a portion of the body comprises a metal shell, the accommodation space is located within the metal shell, the slot is located in the metal shell, and the slot connects the accommodation space and an exterior edge of the metal shell;
    an induction coil, disposed in the accommodation space and insulatedly abutted against the metal shell;
    a power storage module, disposed in the body and electrically connected to the induction coil; and
    an electromagnetic absorption member, disposed in the accommodation space to shield the induction coil, the power transmitting device being adapted to magnetically resonate with the metal shell through generating an electromagnetic field, wherein the metal shell generates an induced current and a corresponding electromagnetic field along the slot, and the induction coil is configured to convert energy of the corresponding electromagnetic field into a power that is to be transferred and stored in the power storage module, wherein the metal shell has a first surface and a second surface opposite to each other, the power transmitting device is adapted to face the first surface, and the induction coil is located between the electromagnetic absorption member and the first surface.

2. The wireless charging receiving device as recited in claim 1, further comprising an insulation member disposed in the accommodation space and located within the induction coil, a side of the insulation member is abutted against the electromagnetic absorption member, and another side of the insulation member extends from the accommodation space to the first surface.

3. The wireless charging receiving device as recited in claim 1, wherein the slot connects the first surface and the second surface by penetrating through the metal shell.

4. The wireless charging receiving device as recited in claim 1, wherein the body comprises a first member and a second member, the second member is hinge jointed with the first member so that the second member is able to open up and close off relative to the first member, the second member is the metal shell, and when the second member opens up relative to the first member, the power transmitting device is adapted to face towards a surface of the second member.

5. The wireless charging receiving device as recited in claim 4, wherein the second member has a first edge and a second edge opposite to each other, the first edge is hinge jointed with the first member, and the slot is located at the first edge and breaks open the first edge.

6. The wireless charging receiving device as recited in claim 5, wherein an electrical insulation structure is further included at where the first member and the second member are hinge jointed.

7. The wireless charging receiving device as recited in claim 4, wherein the second member has a first edge and a second edge different from each other, the first edge is hinge jointed with the first member, and the slot is located at the second edge and breaks open the second edge.

8. The wireless charging receiving device as recited in claim 1, wherein the electromagnetic absorption member is a ferrite sheet material.

9. The wireless charging receiving device as recited in claim 1, further comprising a copper foil and a conductive pressure sensitive adhesive, wherein the induction coil is insulatedly abutted against the copper foil, and the conductive pressure sensitive adhesive is coated between the copper foil and the metal shell.

* * * * *